United States Patent [19]
Ohji

[11] Patent Number: 5,750,251
[45] Date of Patent: May 12, 1998

[54] MULTILAYERED SOFT MAGNETIC FILM AND MAGNETIC HEAD USING THE SAME

[75] Inventor: Hiroshi Ohji, Amagasaki, Japan

[73] Assignee: Mitsubishi Denki Kabushiki Kaisha, Tokyo, Japan

[21] Appl. No.: 139,110

[22] Filed: Oct. 21, 1993

[30] Foreign Application Priority Data

May 6, 1993 [JP] Japan ................ 5-105520

[51] Int. Cl.$^6$ ................ G11B 5/60
[52] U.S. Cl. ................ 428/332; 428/336; 428/692; 428/693; 428/694 R; 428/694 T; 428/694 TS; 428/694 TP; 428/694 TM; 428/694.56; 428/900; 204/192.2
[58] Field of Search ................ 428/694 R, 694 T, 428/694 TS, 694 TP, 694 TM, 694 SG, 332, 336, 692, 693, 900; 204/192.2

[56] References Cited

U.S. PATENT DOCUMENTS

| | | | |
|---|---|---|---|
| 3,864,751 | 2/1975 | Besulieu | 360/113 |
| 4,663,685 | 5/1987 | Tsang | 360/113 |
| 4,835,069 | 5/1989 | Sawada | 428/694 T |
| 5,001,586 | 3/1991 | Aboat | 360/113 |
| 5,057,380 | 10/1991 | Mayashi | 428/692 |
| 5,068,147 | 11/1991 | Mori | 428/336 |

FOREIGN PATENT DOCUMENTS 3-89502  4/1991  Japan.

OTHER PUBLICATIONS

N. Kumasaka et al., "Magnetic Properties of Multilayered Fe–Si Films", *J. Appl. Phys.*, vol. 55, No. 6, Mar. 15, 1984, pp. 2238–2240.

T. Kobayashi et al., "Magnetic Properties of Multilayered Fe–C Film Formed by Dual Ion Beam Sputtering", *IEEE Transactions on Magnetics*, vol. MAG–23, No. 5, Sep. 1987, pp. 2746–2748.

H. Ohji et al., "Magnetic Properties of Fe–6wt%Ni/Permalloy Multilayered Films", *Journal of the Magnetics Society of Japan*, vol. 15, Supplemental No. S2, 1991, pp. 119–124.

*Primary Examiner*—Leszek Kiliman
*Attorney, Agent, or Firm*—Burns, Doane, Swecker & Mathis, LLP

[57] ABSTRACT

A multilayered soft magnetic film including a substrate, and a cyclic structure formed on the substrate and comprised of a main magnetic film composed of either Fe or an alloy containing the same as a main component thereof and a base film composed of either Ni-Fe alloy or an alloy containing the same as a main component thereof which are stacked alternately and repeatedly. The main magnetic film is 500 nm thick or thinner per film, while the base film is 20 nm thick or thinner per film. A thickness ratio of the main magnetic film to the base film per film is 1 or larger. The multilayered soft magnetic film exhibits good soft magnetic properties form the very beginning while maintaining a high initial permeability even after subjected to a heat treatment at a high temperature.

23 Claims, 12 Drawing Sheets

MULTILAYERED SOFT MAGNETIC FILM AND MAGNETIC HEAD USING THE SAME

BACKGROUND OF THE INVENTION

The present invention relates to a multilayered soft magnetic film and, more particularly, to a multilayered soft magnetic film used for a magnetic head in a magnetic recording/reproduction apparatus such as a VTR, and to a magnetic head using the same.

With increasing improvements year after year on the recording density in the magnetic recording technology, there has been a strong desire to develop a soft magnetic material of high saturation flux density which enables satisfactory writing to a recording medium of high coercivity. Enhancement of the coercivity (Hc) of a magnetic recording medium is indispensable for an increase in the recording density of a magnetic recording/reproduction device such as a magnetic disk, floppy disk device, or a magnetic tape device. On the other hand, a magnetic head for writing signals on a recording medium needs to comprise a magnetic material of high saturation flux density (Bs) so as to sufficiently magnetize such a medium of high coercivity. In addition, the material for a magnetic head is also required to have favorable soft magnetic properties so as to efficiently converge a signal magnetic field from the magnetic recording medium in reproducing signals.

FIG. 12 is a fragmentary section showing the structure of a multilayered magnetic film disclosed in, for example, Japanese Unexamined Patent Publication No. 89502/1991, which magnetic film has been developed to meet the aforesaid requirements. This prior art multilayered magnetic film comprises a substrate 11, a ferromagnetic layer 12 composed of Fe or mainly of the same and formed on the substrate 11, and another ferromagnetic layer 13 composed of Ni-Fe alloy or mainly of the same and formed on the ferromagnetic layer 12. The ferromagnetic layers 12 and 13 are alternately stacked to form a multilayered magnetic film of cyclic structure.

This prior art multilayered magnetic film thus constructed is characterized in that the thickness of one stack cycle (thickness of a pair of layers 12 and 13) is in the range of from 5 nm to 20 nm, and that the proportion of the ferromagnetic layer composed of Fe or mainly of the same in one stack cycle is in the range of from 40% to 60%. In the prior art multilayered magnetic film, in addition, the magnetocrystalline anisotropy thereof is weakened by making the grain size of the material of high saturation flux density finer so that the material could obtain soft magnetic properties.

As described above, the prior art multilayered magnetic film obtains excellent soft magnetic properties by specifying the stack cylce or the thickness ratio of the Fe ferromagnetic layer to the Ni-Fe alloy ferromagnetic layer.

FIG. 13 is a graph showing the dependence of magnetic properties on the stack cycle in such a prior art multilayered magnetic film. Specifically this graph demonstrates respective changes in the coercivity (Hc) and anisotropic magnetic field (Hk) of a Fe/Ni-Fe multilayered film as the thickness of the stack cycle is varied while the thickness ratio of the Fe ferromagnetic layer to the Ni-Fe alloy ferromagnetic layer is fixed at 1:1.

FIG. 14 is a graph appearing in, for example, Journal of the Magnetics Society of Japan, Vol. 15, 29pB-11 and showing the dependence of the initial permeability of a multilayered soft magnetic film on the temperature of a heat treatment. This graph teaches that the prior art multilayered soft magnetic film is improved in heat resistance if the ratio of a main magnetic film mainly composed of Fe to a base film mainly composed of Ni-Fe is increased to suppress the influence due to diffusion. In increasing such a ratio the thickness of each main magnetic film is made larger.

Since the prior art multilayered soft magnetic film of high saturation flux density has the aforementioned characteristics, if the thickness of each main magnetic film is made larger, the grain size thereof increases to cause an increase in the coercivity thereof. Therefore, the thickness of each main magnetic film must be made smaller to decrease the thickness of one stack cycle. For example, in glass molding which is a high temperature heat treatment (at 500° C. or above) and forms a part of the magnetic head manufacturing process, the grain size of the magnetic layer increases thereby to degrade the magnetic properties thereof. Hence, the thickness of one stack cycle should be made smaller. This, however, results in a problem that the magnetic properties of the multilayered magnetic film are degraded because of mutual diffusion around the boundaries between layers and a like inconvenience.

Further, the dependence of the initial permeability on a heat treatment at about 500° C. for about an hour is improved by increasing the thickness of each ratio thereof to the base film mainly composed of Ni-Fe. However, if the conditions such as temperature and duration for heat treatment become severer, a problem can occur because the grain size of the main magnetic film tends to readily grow because of its large thickness and, thereby, the soft magnetic properties of the resulting multilayered film are degraded.

The present invention has been attained in view of the foregoing problems. It is, therefore, a first object of the present invention to provide a multilayered soft magnetic film exhibiting excellent soft magnetic properties even immediately after it is processed. It is a second object of the present invention to provide a multilayered soft magnetic film capable of maintaining its initial permeability at a sufficiently high degree even if it is processed under a high-temperature heat treatment.

SUMMARY OF THE INVENTION

According to the present invention, there is provided a multilayered soft magnetic film comprising base films composed of either Ni-Fe alloy or an alloy containing Ni and Fe as main components, and main magnetic films composed of either Fe or an alloy containing Fe as a main component; said base film and said main magnetic films being stacked alternately and repeatedly on a substrate so as to form a cyclic structure; wherein the thickness of each main magnetic films is 500 nm or less, and the thickness of each of said base films is 20 nm or less; and the thickness ratio of said main magnetic film to said base film is 1 or larger.

The multilayered soft magnetic film having such a cyclic structure according to the present invention may be manufactured by alternately stacking on a substrate base films composed of either Ni-Fe alloy or an alloy containing Ni and Fe as main components and main magnetic films composed of either Fe or an alloy containing Fe as a main component by a physical vapor deposition process or by a chemical vapor deposition process (CVD).

The present invention, in another aspect, provides a magnetic head for use in a magnetic recording/ reproduction apparatus, comprising a magnetic circuit, at least a part of which is formed of said multilayered soft magnetic film.

In yet another aspect of the present invention, there is provided a magnetic recording/reproduction apparatus comprising a combination of said magnetic head and a magnetic recording/reproduction medium of which coercivity is 1500 Oe or more.

The multilayered soft magnetic film of the present invention may be formed at its top surface with a film of either $SiO_2$ or another non-metal material so as to restrain the stress and grain size thereof and prevent the surface thereof from corrosion.

Alternatively, such a film of either $SiO_2$ or another non-metal material may be formed between the substrate and the cyclic structure so as to inhibit the substrate from warping and obtain a favorable surface condition of the substrate.

If the surface roughness of the substrate prior to forming thereon the film of either $SiO_2$ or another non-metal material is set to 0.5 µm or less, the crystallinity of the multilayered soft magnetic film of the present invention is improved thereby enhancing the soft magnetic properties thereof.

In the present invention, the base film and the main magnetic film may be formed under application of an appropriate external magnetic field in one direction in the plane of the substrate, whereby an anisotropic magnetic field of the resulting multilayered magnetic film is controlled to an appropriate value thereby to improve the soft magnetic properties thereof.

When the substrate is composed of, for example, aluminum titanium carbide, the base film and main magnetic film may be formed with the substrate heated at 50° C. or above, whereby the crystallinity of the resulting multilayered soft magnetic film is improved while it becomes possible to reduce the internal stress of the multilayered film due to thermal stress because the multilayered film will never be cooled rapidly.

In the multilayered soft magnetic film of the present invention, when the thickness ratio of the main magnetic film to the base film is made large, for example 30 or larger, but the thickness of the main magnetic film per film is made relatively small, harmful effects due to the mutual diffusion around the boundaries between films can be relieved to a low degree even if the multilayered film undergoes a magnetic head manufacturing process including a high temperature heat treatment. In addition, an increase in grain size due to the heat treatment can also be restrained with the initial permeability of the multilayered film maintained at a high degree.

The magnetic head of the present invention is capable of easily writing on a medium of high coercivity which has hitherto been impossible to be written.

Further, the magnetic head obtained through a heat treatment process in which the multilayered soft magnetic film is heated under application of an external magnetic field is improved in reproduction output since the anisotropic magnetic field of the multilayered soft magnetic film is controlled to an appropriate value.

The magnetic recording/reproduction apparatus of the present invention which comprises a combination of the aforesaid magnetic head and a magnetic recording/ reproduction medium having a coercivity of 1500 Oe or more offers a recording density further improved than ever and an increased reproduction output.

In the multilayered soft magnetic film of the present invention, the main magnetic film is composed of either Fe or an alloy containing Fe as a main component thereof. Examples of the elements forming the alloy together with Fe include Si, C, Ni, Co, Ti, V, Zr, Ta, Hf, Cr, Ru, Nb, Mo, and W, among which Si, C, Ni, and Co are particularly preferable. In the case of Co, it is contained in an amount of 50% by weight or less in the main magnetic film. The element other than Co would be contained in an amount of 30% by weight or less. The main magnetic film may contain trace amounts of metals other than aforementioned.

The base film is composed of either Ni-Fe alloy (weight ratio of Ni to Fe: 40/60 to 90/10) or an alloy containing the Ni-Fe alloy as a main component thereof. The elements which may be added to the Ni-Fe alloy include any elements that will not degrade the properties of the base film, for example, those usable for the above Fe alloy.

The thickness of the main magnetic film is 500 nm or smaller. When it exceeds 500 nm, there are likely to occur degradation of crystallinity, increase in grain size, and the like. The main magnetic film is preferably 300 nm thick or thinner, more preferably 100 nm thick or thinner.

The thickness of the base film is 20 nm or smaller. When it is larger than 20 nm, there may be unfavorable influences on the saturation flux density of the multilayered soft magnetic film, though the present invention inherently aims to obtain a multilayered soft magnetic film of high saturation flux density. In particular, if there is a post heat treatment, thermal diffusion is likely to occur and, hence, the soft magnetic properties of the multilayered soft magnetic film tend to degrade. The base film is preferably 10 nm thick or thinner, more preferably 5 nm thick or thinner.

The multilayered soft magnetic film of the present invention comprises a cyclic structure in which the base film and the main magnetic film are alternately and repeatedly stacked on the substrate. Stacking alternately of the two films is repeated once or more, usually about 3 to about 240 times depending on the application of the resulting multilayered film.

The thickness ratio of one main magnetic film to one base film is preferably small (refer to FIG. 2). In view of high saturation flux density at which the present invention aims, the thickness ratio is specifically 1 or larger, more preferably 5 or larger, especially 15 or larger. In case that a high temperature heat treatment is performed as a post-treatment, for example, if a magnetic head is manufactured through a procedure including a glass molding process, mutual diffusion due to the heat treatment causes the soft magnetic properties of the multilayered film to degrade. However, when the thickness ratio is set to 30 or larger, such degradation in the soft magnetic properties is restrained to a very low degree (refer to FIG. 3).

The multilayered soft magnetic film of the present invention may be formed with a film of either $SiO_2$ or other non-metal at the top surface thereof, between the substrate and the cyclic structure thereof, and/or intermediate the cyclic structure thereof. Examples of non-metals other than $SiO_2$ include $Ta_2O_3$, $Al_2O_3$, and silicon nitride. Preferably such a film is 0.5 µm thick or thinner.

The substrate is composed of a material such as $CaTiO_3$, $Al_2O_3$, aluminum titanium carbide, glass, or crystallized glass.

The multilayered soft magnetic film of the present invention is manufactured in, for example, the following manner. First, if necessary, a substrate is lapped using a lapping machine to adjust the surface roughness thereof to 0.5 µm or less. The surface roughness of the substrate is preferably 0.02 µm or less, more preferably 0.003 µm or less. On the substrate an $SiO_2$ film is optionally formed by a physical or chemical vapor deposition process such as sputtering or CVD. Subsequently, a base film of Ni-Fe alloy is formed on the substrate or, if any, on the SiO₂ film and then a main magnetic film of Fe is formed on the base film by a physical or chemical vapor deposition process such as sputtering or CVD while the substrate is heated at 50° C. or above, preferably 100° C. or above, more preferably between 100° C. and 200° C. This alternate film formation of the base film and main magnetic film is repeated to form a cyclic structure. In this film formation, if necessary, an external magnetic field of about 30 to about 3000 Oe is applied in one direction in the plane of the base film or main magnetic film with use of a magnet. When a multilayered film of a desired thickness is obtained, an SiO₂ film may further be stacked on the surface of the multilayered film.

A magnetic head is manufactured by providing a coil window, a gap and the like, joining the parts together, and cutting to a desired shape according to a common method. There are two ways of manufacturing a magnetic head with use of a soft magnetic film, one including a glass molding process involving a high temperature heat treatment, the other including an etching process. The multilayered soft magnetic film of the present invention is applicable to any of the two ways. In the case of the former, any prior art soft magnetic film is degraded in its properties because of the heat treatment, as described earlier. However, the multilayered soft magnetic film of the present invention, particularly with thickness ratio is 30 or larger, can maintain its high initial permeability even if subjected to a heat treatment exceeding 500° C. Preferably the heat treatment is performed under application of an external magnetic field of about 30 to about 3000 Oe. When a magnetic recording/ reproduction apparatus, for example a VTR, is manufactured with use of this magnetic head, the magnetic head is mounted on a rotary drum, then a tape-running system, electric circuit for recording/reproduction and the like are provided, and finally a magnetic recording/reproduction medium having a coercivity of 1500 Oe or more is combined with the apparatus. The coercivity of this magnetic recording/reproduction medium is preferably within the range of from 2000 to 4000 Oe.

DETAILED DESCRIPTION

The present invention will now be described in detail by way of the preferred embodiments thereof with reference to the drawings.

Example 1

Figure 1:
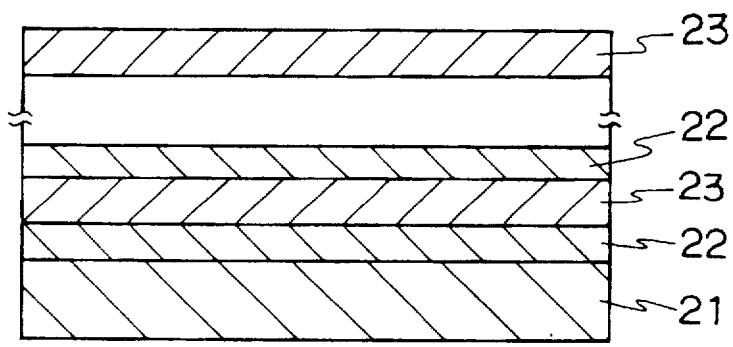
FIG. 1 is a fragmentary section showing the structure of a multilayered soft magnetic film embodying the present invention.

FIG. 1 is a fragmentary section showing the structure of a multilayered soft magnetic film according to the present embodiment. The multilayered soft magnetic film shown in FIG. 1 comprises a CaTiO₃ substrate 21, a base film 22 composed of either Ni-Fe alloy or an alloy containing the same as a main component and formed on the substrate 21, and a main magnetic film 23 composed of either Fe or an alloy containing the same as a main component and formed on the base film 22.

The main magnetic film 23 and the base film 22 are alternately stacked to form a multilayered film having a cyclic structure. The cyclic stacking is repeated at least once by sputtering to form the multilayered soft magnetic film having a cyclic structure as shown in FIG. 1. The multilayered soft magnetic film of the present embodiment is characterized in that the thickness of the main magnetic film 23 composed of either Fe or an alloy containing the same as a main component is 500 nm or smaller while the thickness of the base film 22 composed of either Ni-Fe alloy or an alloy containing the same as a main component is 20 nm or smaller, and that the ratio of the former to the latter is 1 or larger.

Figure 2:
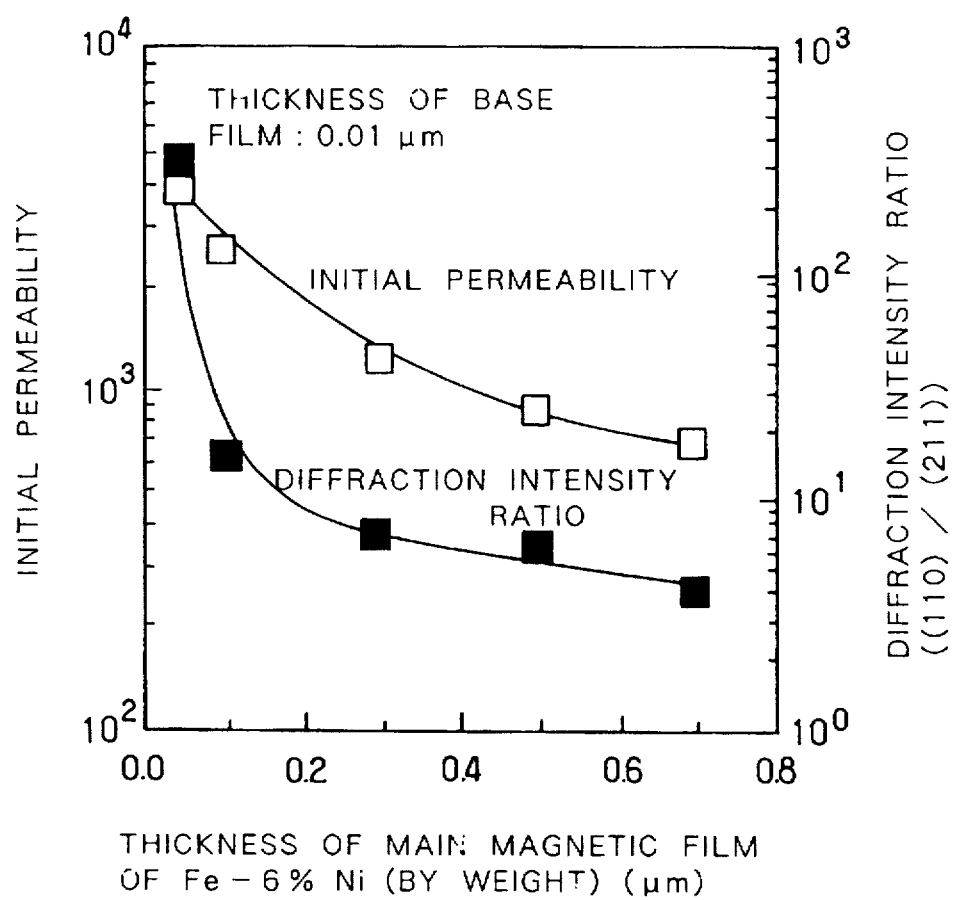
FIG. 2 is a graph showing the dependence of the initial permeability of a multilayered soft magnetic film embodying the present invention and that of the X-ray diffraction intensity ratio thereof on the thickness of the Fe-Ni alloy main magnetic film.

FIG. 2 is a graph showing the dependence of the initial permeability of a multilayered soft magnetic film and that of the X-ray diffraction intensity ratio ((110)/(211)) on the thickness of an Fe-Ni alloy main magnetic film. The multilayered soft magnetic film as a measuring object in FIG. 2 is formed by depositing on a glass substrate a base film of Ni-19.1% (by weight) Fe alloy and a main magnetic film of Fe-6% (by weight) Ni alloy by sputtering under water cooling. In this graph the two vertical axes represent the initial permeability of the multilayered film and the X-ray diffraction intensity ratio of the main magnetic film, respectively, while the horizontal axis represents the thickness of the main magnetic film. In the multilayered soft magnetic film as a measuring object, the thickness of the base film is fixed at 10 nm while the thickness of the main magnetic film is varied as shown in the graph, and the stack cycle is repeated at least four times to have a total thickness of about 3 μm. Further, an external magnetic field of 70 Oe is applied to the sample in one direction in the plane thereof during the film formation.

As apparent from FIG. 2, there is a very good correlation between the initial permeability and the X-ray diffraction intensity ratio. From this fact, the crystal orientation of the main magnetic film is found to be an important factor for realizing a high initial permeability. Also, it is found from FIG. 2 that the thinner is the main magnetic film, the higher is the initial permeability; that is, as the thickness ratio decreases the soft magnetic properties become increasingly excellent.

Figure 3:
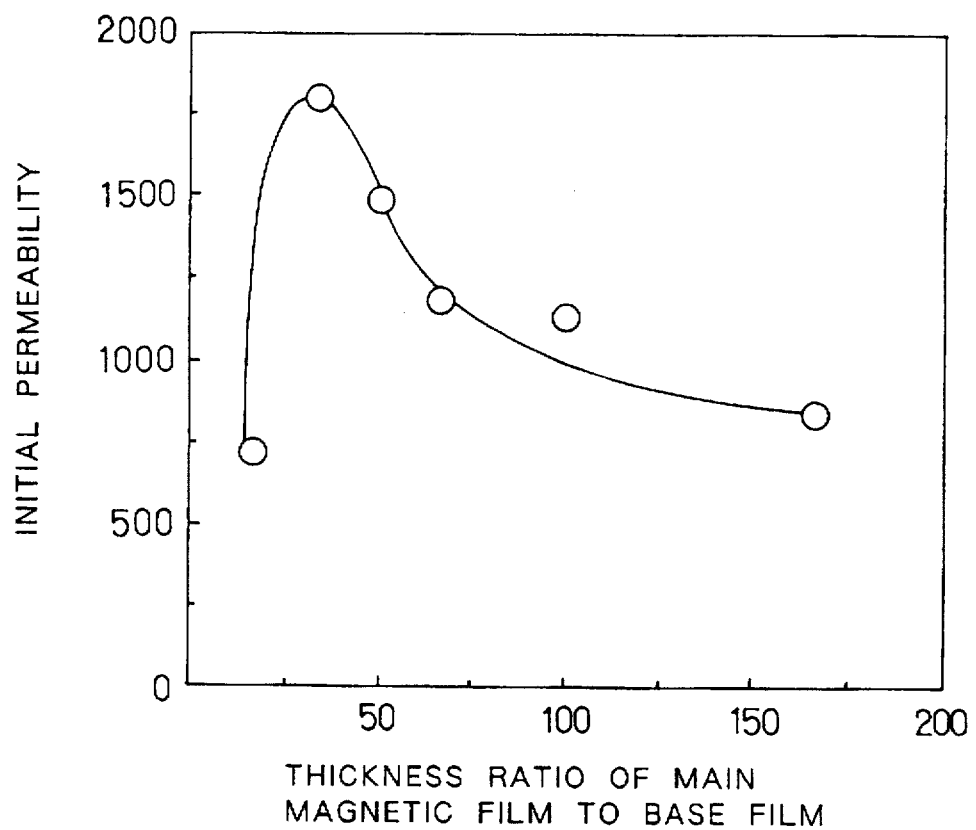
FIG. 3 is a graph showing a change in the initial permeability of a multilayered soft magnetic film embodying the present invention and having been heat-treated with its thickness ratio differently varied.

FIG. 3 is a graph showing the dependence of the initial permeability of a multilayered soft magnetic film having been heat-treated on the thickness ratio of main magnetic film/base film. The multilayered soft magnetic film as a measuring object in FIG. 3 is formed by depositing on a CaTiO₃ substrate a base film of Ni-19.1% (by weight) Fe alloy and a main magnetic film of Fe-9% (by weight) Si alloy and alternately stacking these films by sputtering under water cooling. In this graph the vertical axis represents the initial permeability of the multilayered soft magnetic film while the horizontal axis represents the thickness ratio of the main magnetic film to the base film. In this multilayered soft magnetic film, the thickness ratio is varied by varying the thickness of the main magnetic film with the base film fixed at 3 nm in thickness, and the stack cycle is repeated at least 12 times to have a total thickness of about 6 μm. Further, an external magnetic field of 70 Oe is applied to the sample in one direction in the plane thereof during the film formation. Note that the resulting multilayered soft magnetic film has been heat-treated at 520° C. for two hours under nitrogen atmosphere prior to the measurements.

As apparent from FIG. 3, although the initial permeability is increasingly improved with decreasing thickness ratio, it drops sharply when the thickness ratio is less than 30. This is because when the thickness ratio decreases too much, diffusion occurs between the base film and the main magnetic film due to the heat treatment thereby disturbing the aforementioned crystal orientation of the main magnetic film. On the other hand, when the thickness ratio is within the range of 30 or more, the initial permeability after the heat treatment increases with decreasing thickness ratio. This is because the grain size is increasingly suppresssed as the thickness of the main magnetic film per film decreases. Accordingly, in order to maintain exellent soft magnetic properties of the multilayered soft magnetic film even after it is subjected to a heat treatment performed in, for example, the glass molding step included in the magnetic head manufacturing process, the thickness ratio of the main magnetic film to the base film needs to be set to 30 or larger, while the main magnetic film is made relatively thin.

However, in an application in which the multilayered soft magnetic film is not heat-treated, or in a magnetic head manufactured by etching or a like method, the multilayered soft magnetic film having a thickness ratio of even 1 or larger exhibits excellent soft magnetic properties as shown in FIG. 2.

Example 2

Table 1 shows the respective initial permeabilities of two multilayered soft magnetic films according to Example 1, one being free of an SiO₂ film at its top, the other being provided with an SiO₂ film at its top by sputtering. These films as the measuring object are formed by depositing on a CaTiO₃ substrate a base film of Ni-19.1% (by weight) Fe alloy and a main magnetic film of Fe-9% (by weight) Si alloy by sputtering under water cooling. These two films each include two samples, one having a 3 nm-thick base film and a 300 nm-thick main magnetic film which are alternately stacked and cyclically repeated at least five times to have a total thickness of about 1.6 μm, the other having a 3 nm-thick base film and a 200 nm-thick main magnetic film which are also alternately stacked and cyclically repeated at least five times to have a total thickness of about 1.6 μm. The SiO₂ film formed on top of the multilayered film is 100 nm thick. During the formation of each multilayered soft magnetic film, an external magnetic field of 70 Oe is applied to the sample in one direction in the plane thereof.

TABLE 1

|  | Main magnetic film thickness (nm)/ Base film thickness (nm) | |
|---|---|---|
|  | 300/3 | 200/3 |
| Absence of SiO₂ on top surface | 1664 | 3894 |
| Presence of SiO₂ on top surface | 3527 | 5320 |

As apparent from Table 1, the provision of SiO₂ film on top of multilayered film assures a high initial permeability in any of the samples which are different in the thickness of the main magnetic film and, thus, enhances the soft magnetic properties thereof.

Example 3

Figure 4:
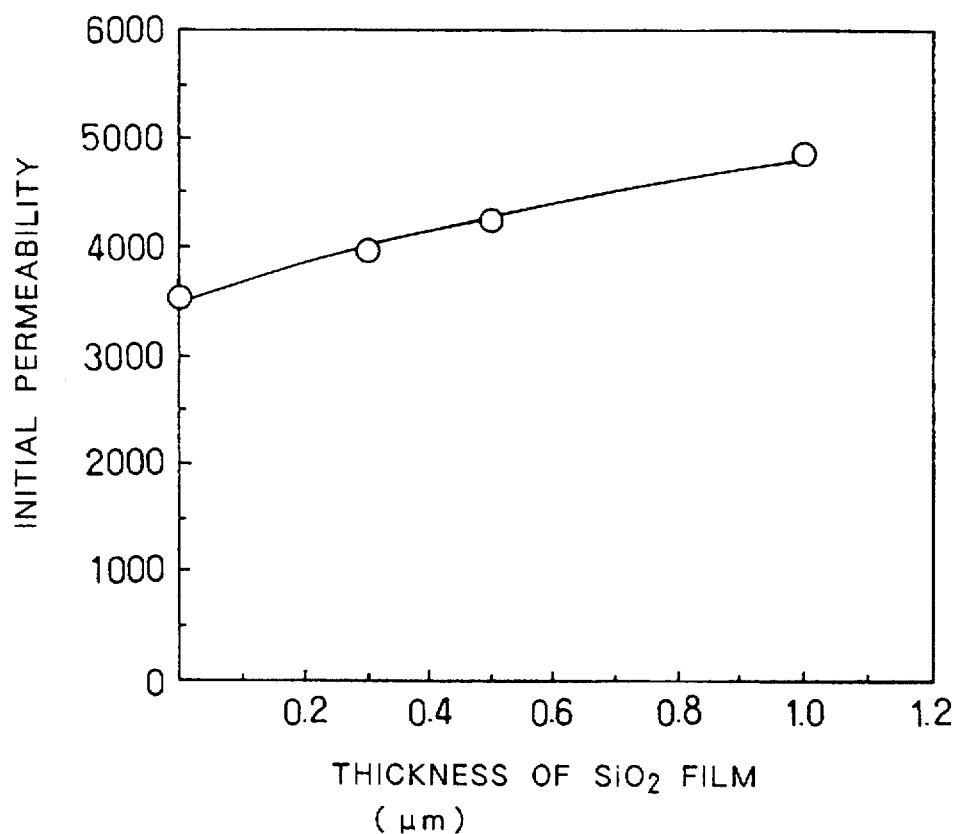
FIG. 4 is a graph showing the dependence of the initial permeability of a multilayered soft magnetic film embodying the present invention on the thickness of an SiO₂ film inserted between the substrate and the base film.

FIG. 4 shows the dependence of the initial permeability on the thickness of an SiO₂ film interposed between the substrate and the multilayered film. In FIG. 4, the multilayered soft magnetic film as a measuring object is formed by stacking a base film of Ni-19.1% (by weight) Fe alloy and a main magnetic film of Fe-9% (by weight) Si alloy in a manner similar to that of Example 2. Further, the vertical axis of FIG. 4 represents the initial permeability of the multilayered soft magnetic film while the horizontal axis represents the thickness of the SiO₂ film. In the multilayered soft magnetic film, the stack cycle of the subordinate film of 3 nm thickness and the main magnetic film of 300 nm thickness is repeated five times to have a total thickness of about 1.5 μm. During the formation of the multilayered film an external magnetic field of 70 Oe is applied to the sample in one direction in the plane thereof.

As apparent from FIG. 4, the initial permeability of the multilayered film increases with increasing SiO₂ film thickness and, hence, the thickness of the SiO₂ film interposed between the substrate and the multilayered film is found to be important for an improvement in the soft magnetic properties of the multilayered film.

Example 4

Table 2 shows the dependence of the initial permeability of a multilayered soft magnetic film on the surface roughness of CaTiO₃ substrate. In Table 2, the multilayered soft magnetic film as a measuring object is formed by stacking a base film of Ni-19.1% (by weight) Fe alloy and a main magnetic film of Fe-9% (by weight) Si alloy in a manner similar to that of Example 2. In the multilayered soft magnetic film, the stack cycle of the base film of 3 nm thickness and main magnetic film of 300 nm thickness is repeated five times to have a total thickness of about 1.5 μm. During the formation of the mulitlayered film an external magnetic field of 70 Oe is applied to the sample in one direction in the plane thereof.

TABLE 2

| Surface roughness (nm) | Initial permeablity |
|---|---|
| 3 | 3527 |
| 20 | 1683 |
| 500 | 487 |
| 1000 | 442 |

As apparent from Table 2, the surface condition of the substrate greatly influences the magnetic properties of the multilayered soft magnetic film, and the surface roughness of the substrate needs to be set to less than 0.5 μm for obtaining a higher initial permeability.

Example 5

Table 3 shows the dependence of the initial permeability of a multilayered soft magnetic film on the temperature of substrate (aluminum titanium carbide). In Table 3 the multilayered soft magnetic film as the measuring object is formed by stacking a base film of Ni-19.1% (by weight) Fe alloy and a main magnetic film of Fe-9% (by weight) Si alloy in a manner similar to that of Example 2 except for the substrate temperature. In the multilayered soft magnetic film, the stack cycle of the base film of 10 nm thickness and main magnetic film of 200 nm thickness is repeated eight times to have a total thickness of about 1.6 μm.

TABLE 3

| Substrate | Substrate temperature | Initial permeability |
| --- | --- | --- |
| Aluminum titanium carbide | water-cooled | 1000 |
| Aluminum titanium carbide | 100° C. | 5300 |

As apparent from Table 3, the initial permeability of the multilayered soft magnetic film is greatly improved by heating the substrate and, hence, substrate heating during the formation of the multilayered film is found to be very effective in improving the soft magnetic properties of the multilayered film.

Example 6

Table 4 shows the initial permeability of a multilayered soft magnetic film having been heat-treated under application of a magnetic field. In Table 4, the multilayered soft magnetic film as measuring object is formed by stacking a base film of Ni-19.1% (by weight) Fe alloy and a main magnetic film of Fe-9% (by weight) Si alloy in a manner similar to that of Example 2. In this multilayered soft magnetic film, the stack cycle of the base film of 3 nm thickness and main magnetic film of 200 nm thickness is repeated 30 times to have a total thickness of about 6 μm. In Table 4, there appear the initial permeability of the multilayered film having been heated in nitrogen atmosphere at 520° C. for two hours and that of the same film having been further subjected to a heat treatment under vaccuum at 500° C. for 30 minutes under application of a DC magnetic field of 80 Oe.

TABLE 4

| | Prior to heat treatment under magnetic field application | After heat treatment under magnetic field application |
| --- | --- | --- |
| Initial Permeability | 1182 | 1446 |

As apparent from Table 4, the heat treatment under application of a magnetic field improves the initial permeability of the multilayered soft magnetic film and, accordingly, including such a heat treatment in the magnetic head manufacturing process is found to be effective for an improvement in magnetic head characteristics.

Example 7

Figure 5:
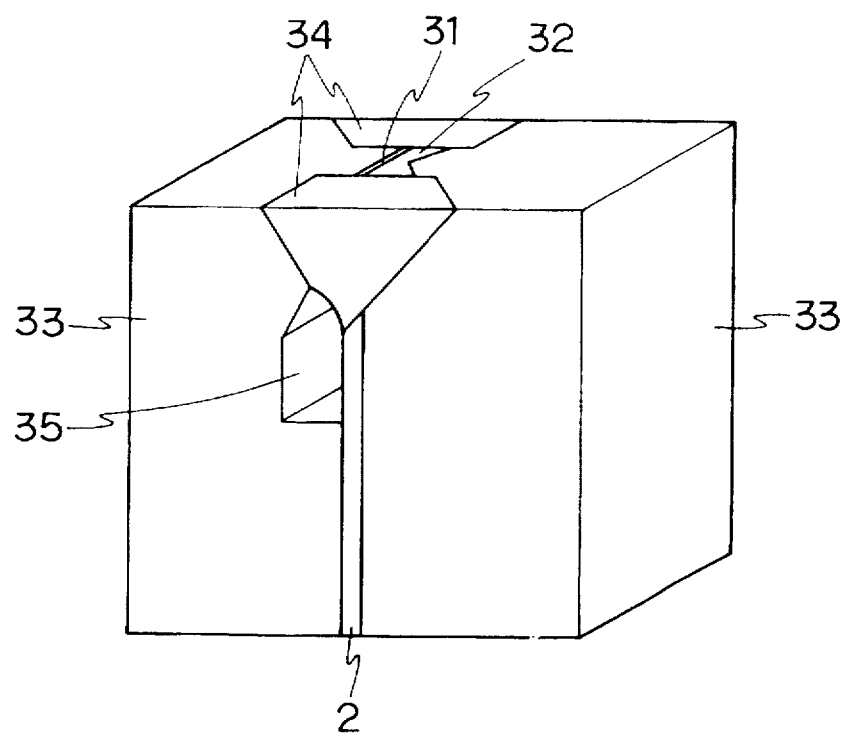
FIG. 5 is a perspective view of a magnetic head incorporating a multilayered soft magnetic film embodying the present invention.

FIG. 5 is a perspective view of a magnetic head in which the multilayered soft magnetic film of the present invention is used. In FIG. 5 the magnetic head comprises an operative gap 31, a multilayered soft magnetic film 32, a pair of magnetic core halves 33, a joint glass 34, and a coil window 35.

The manufacturing procedure for the magnetic head of the above arrangement according to this embodiment will be described with reference to FIGS. 6 to 11.

Figure 6:
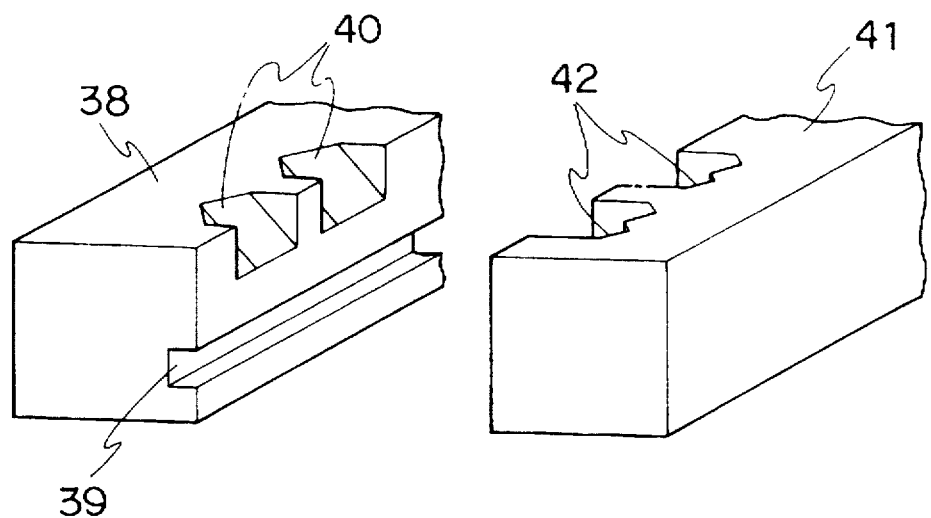
FIGS. 6 to 11 are each a representation for illustrating a step of manufacturing procedure for the magnetic head incorporating the multilayered soft magnetic film.

Referring to FIG. 6, cutting work by a rotary wheel is performed on a ferrite block half 38, which is 15 intended to form the magnetic tape inlet side of the magnetic head, to form a groove 39 for receiving rear gap joint glass and a narrow track groove 40 for controlling a track width. Machining work by the rotary wheel is also performed on a ferrite block 41, which is intended to form the magnetic tape outlet side of the magnetic head, to form a groove 42 for receiving the multilayered soft magnetic film 32 which is the same as that shown in FIG. 1 and which will be deposited on the groove 42 by the aforementioned method. The groove 42 for multilayered film serves to make the interface between the multilayered soft magnetic film 32 and the ferrite block half 41 not parallel to the operative gap 31.

Figure 7:
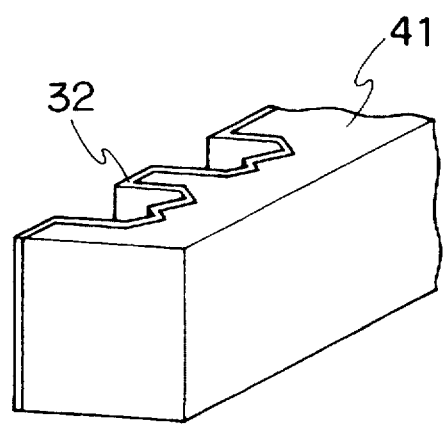
Figure 8:
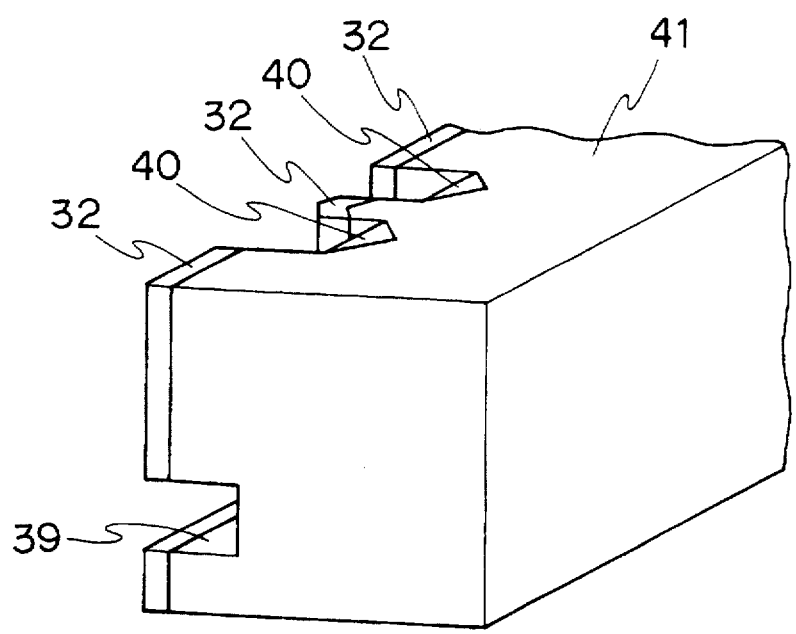

A $SiO_2$ thin film is formed as an intermediate layer on the groove 42 of the ferrite block half 41 thus cut-worked. Further, on the $SiO_2$ thin film is formed the multilayered soft magnetic film 32 as shown in FIG. 7.

Further, a narrow track groove 40 is cut into the ferrite block half 41 as having the same pitch as that of the narrow track groove priorly formed in the ferrite block half 38. Thereafter, the multilayered soft magnetic film 32 deposited on lateral sides of the ferrite block half 41 is removed, and then a groove 39 for receiving rear gap joint glass is cut into the ferrite block half 41. The ferrite block half 41 in this state is shown in the enlarged view of FIG. 8.

Figure 9:
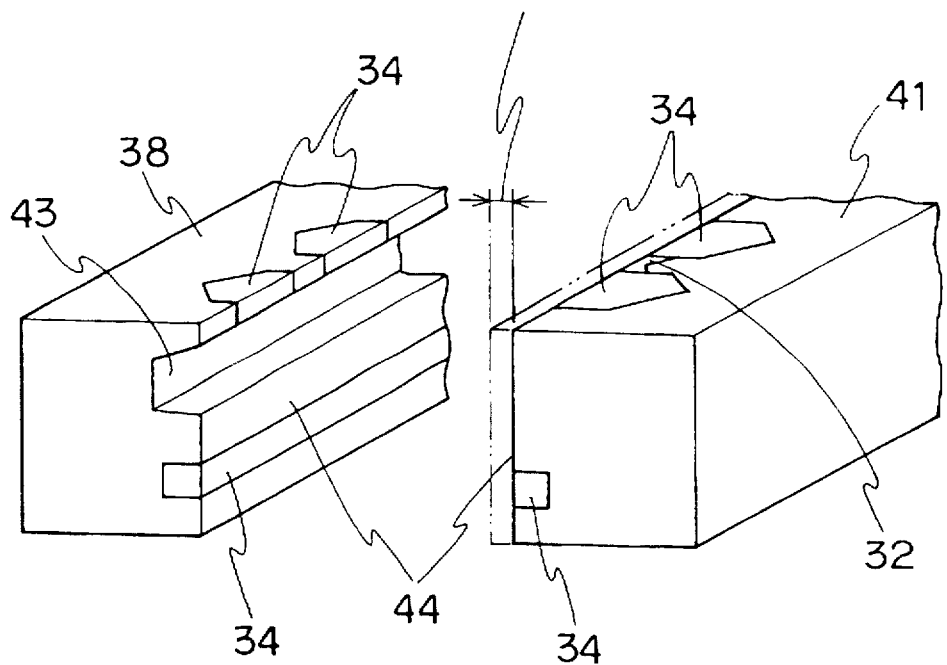

Subsequently, joint glass 34 is molded in both the groove 39 for rear gap joint glass and the narrow track groove 40 of each of the ferrite block halves 38 and 41. The ferrite block half 38 is then cut-worked by the rotary wheel to form a groove 43 serving as a coil window, followed by accurately grinding the gap-mating face 44 of each ferrite block half. The ferrite block halves in this state is shown in FIG. 9.

Figure 10:
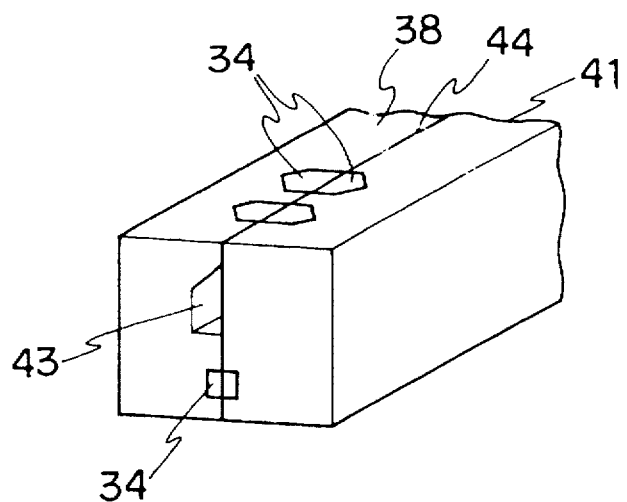

In turn, a $SiO_2$ film, as a gap material, is formed to have a predetermined thickness on the thus ground gap-mating face 44 of each ferrite block half, followed by getting the two ferrite block halves butted. The butted halves 38 and 41 are joined with each other by heating at a predetermined temperature because of the adhesion between the softened joint glasses 34. The thus joined ferrite block half pair is shown in FIG. 10.

Figure 11:
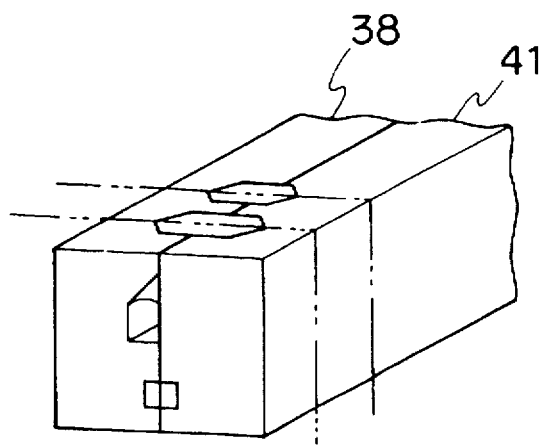
Figure 12:
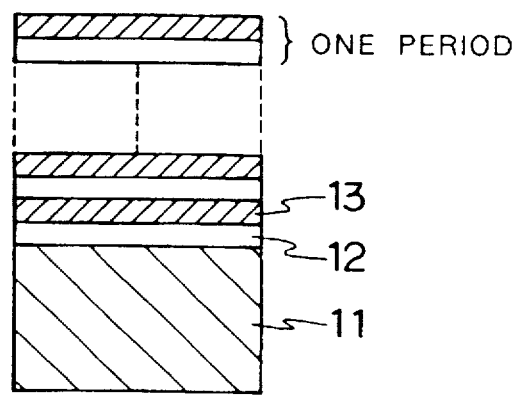
FIG. 12 is a fragmentary section showing the structure of a prior art multilayered magnetic film.
Figure 13:
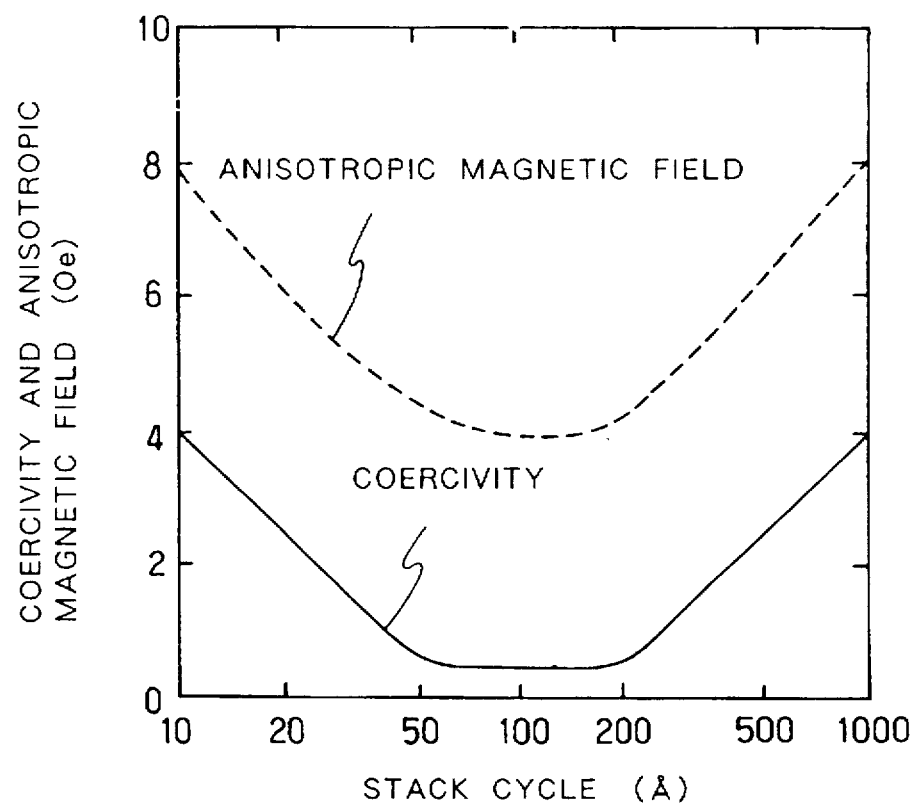
FIG. 13 is a graph showing the dependence of the magnetic properties of the prior art multilayered magnetic film on the thickness of one stack cycle.
Figure 14:
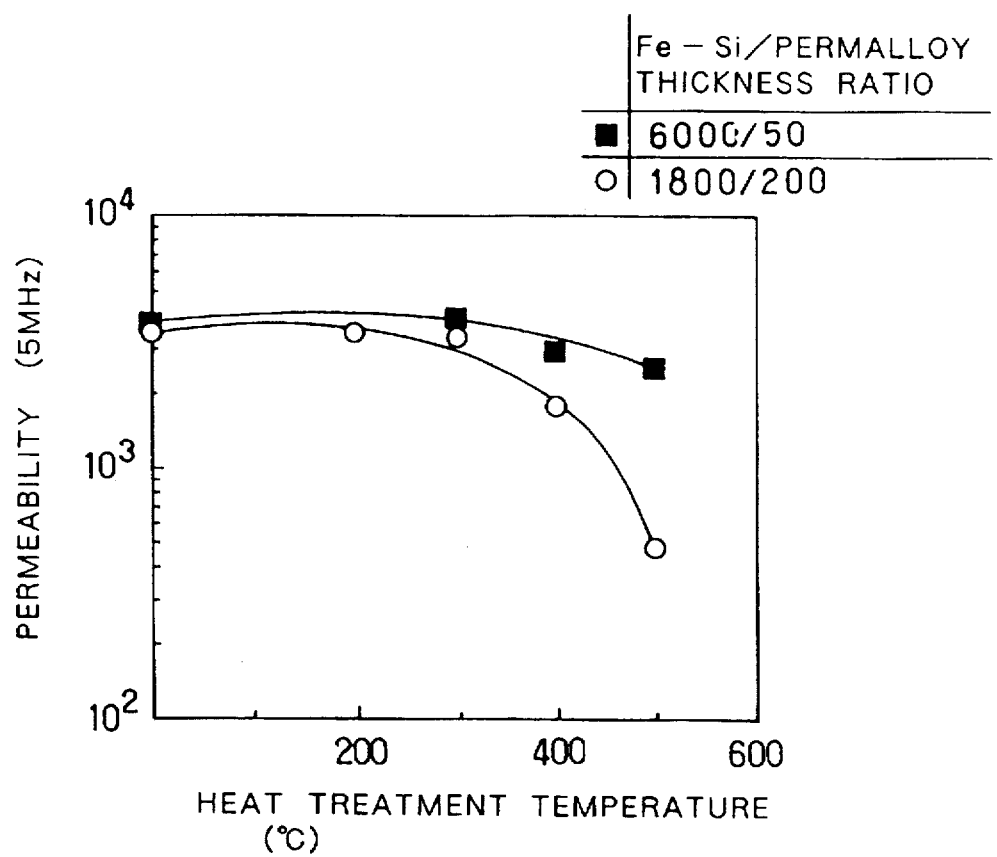
FIG. 14 is a graph showing the thermal stability in the magnetic properties of the prior art multilayered magnetic film.

Finally, the ferrite block half pair thus joined is cut off along chain double-dashed lines in FIG. 11 with a predetermined azimuth angle. Each of the ferrite block half pairs resulting from the cutting-off is a magnetic head core as shown in FIG. 5. Thus, a magnetic head embodying the present invention is completed. With this magnetic head using as part of the magnetic circuit thereof the multilayered soft magnetic fim having a high saturation flux density, satisfactory writing is readily realized with respect to a medium of high coercivity (1500 Oe or more) and, hence, a higher recording density than ever can be attained. Further, by virtue of excellent soft magnetic properties of the multilayered soft magnetic film of the present invention, reproduction output is also improved.

As has been described, the multilayered soft magnetic film of the present invention offers good soft magnetic porperties, i.e. both high saturation flux density and high initial permeability, because the grain size of the main magnetic film is suppressed to grow so as to improve the crystallinity thereof.

According to the present invention, the multilayered film of good soft magnetic properties is obtained by making grains of the main magnetic film restrain to be increased while improving the crystallinity thereof. Hence, increasing the thickness ratio of the main magnetic film to the base film makes it possible to minimize the influences of diffusion due to heat treatment.

Further, according to the present invention, when the multilayered soft magnetic film is formed with a non-metal film such as made of $SiO_2$ between the substrate and the multilayered film or on its top surface, the initial permeability thereof is further improved.

Yet further, according to the present invention, setting the surface roughness of the substrate to 0.5 or less contributes to enhancement of the initial permeability of the multilayered soft magnetic film.

Still further, according to the present invention, heating the substrate during the film formation also contributes to enhancement of the initial permeability of the multilayered soft magnetic film.

Furthermore, according to the present invention, the initial permeability of the multilayered soft magnetic film is further improved if an external magnetic field is applied to the mulitlayered film being formed or being heat-treated in the magnetic head manufacturing process.

Though several embodiments of the present invention are described above, it is to be understood that the present invention is not limited only to the abovementioned, various changes and modifications may be made in the invention without departing from the spirit and scope thereof.

What is claimed is:

1. A multilayered soft magnetic film comprising:
   at least one compound layer alternately comprising
   a base film composed of either Ni-fe alloy or alloy containing Ni and Fe as main components and
   a main magnetic film composed of either Fe or an alloy containing Fe as a main component,
   said base film and said main magnetic film being stacked alternately and repeatedly on a substrate so as to form a cyclic structure,
   wherein the thickness of said main magnetic film is in a range of $0<t\leq 500$ nm, the thickness of said base film is in a range of $0<t\leq 20$ nm, and the thickness ratio of said main magnetic film to said base film is at least 15.

2. The multilayered soft magnetic film of claim 1 further comprising an insulating film between said substrate and said cyclic structure.

3. The multilayered soft magnetic film of claim 1 wherein said base film and said main magnetic film are formed under application of an external magnetic field in one direction in the plane of said substrate.

4. The multilayered soft magnetic film of claim 1, wherein said base film and said main magnetic film are formed while said substrate is heated at a temperature between about 50° C. and 200° C.

5. A method for manufacturing a multilayered soft magnetic film comprising:
   alternately stacking on a substrate at least one compound layer alternately comprising a base film composed of either Ni-Fe alloy or an alloy containing Ni and Fe as main components and a main magnetic film composed of either Fe or an alloy containing Fe as a main component by a physical vapor deposition process or by a chemical vapor deposition process,
   wherein the thickness of said magnetic film is in the range $0<t\leq 500$ nm, the thickness of said base film is in the range $0<t\leq 20$ nm, and the thickness ratio of said main magnetic film to said base film is at least 15.

6. A magnetic head for use in a magnetic recording/ reproduction apparatus, comprising a magnetic circuit, at least a part of which is formed of the multilayered soft magnetic film of claim 1.

7. The magnetic head of claim 6, wherein said multilayered soft magnetic film is heat-treated under application of an external magnetic field.

8. A magnetic recording/reproduction apparatus comprising a combination of the magnetic head of claim 6 and a magnetic recording/reproduction medium of which coercivity is greater than or equal to 1500 Oe.

9. A multilayered soft magnetic film comprising:
   at least one compound layer alternately comprising
   a base film composed of either Ni-Fe alloy or an alloy containing Ni and Fe as main components and
   a main magnetic film composed of either Fe or an alloy containing Fe as a main component,
   said base film and said main magnetic film being stacked alternately and repeatedly on a substrate so as to form a cyclic structure,
   wherein the thickness of said main magnetic film is in a range of $0<t\leq 500$ mn, the thickness of said base film is in a range of $0<t\leq 20$ nm, and the thickness ratio of said main magnetic film to said base film is at least 1, and
   said multilayered soft magnetic film further comprising an insulating film on a top surface thereof.

10. A method for manufacturing a multilayered soft magnetic film comprising:
    alternately stacking on a substrate at least one compound layer alternately comprising a base film composed of either Ni-Fe alloy or an alloy containing Ni and Fe as main components and a main magnetic film composed of either Fe or an Alloy containing Fe as a main component by a physical vapor deposition process or by a chemical vapor deposition process,
    wherein the thickness of said magnetic film is in the range $0<t\leq 500$ nm, the thickness of said base film is in the range $0<t\leq 20$ nm, and the thickness ratio of said main magnetic film to said base film is at least 1, and
    said method further comprises stacking an insulating film on the top surface thereof.

11. The multi-layered soft magnetic film of claim 9, wherein the thickness ratio of said main magnetic film to said base film is at least 15.

12. A multilayered soft magnetic film comprising:
    at least one compound layer alternately comprising
    a base film composed of either Ni-Fe alloy or an alloy containing Ni and
    Fe as main components and
    a main magnetic film composed of either Fe or an alloy containing Fe as a main component,
    said base film and said main magnetic film being stacked alternately and repeatedly on a substrate so as to form a cyclic structure, wherein the thickness of said main magnetic film is in a range of 0<t≦500 nm, the thickness of said base film is in a range of 0<t≦20 nm, and the thickness ratio of said main magnetic film to said base film is at least 1, and said multilayered soft magnetic film further comprising a first insulating film on the top surface thereof and a second insulating film 1 between said substrate and said cyclic structure.

13. A multilayered soft magnetic film comprising:

at least one compound layer alternately comprising a base film composed of either Ni-Fe alloy or an alloy containing Ni and Fe as main components and a main magnetic film composed of either Fe or an alloy containing Fe as a main component, said base film and said main magnetic film being stacked alternately and repeatedly on a substrate so as to form a cyclic structure;

wherein the thickness of said main magnetic film is in a range of 0<t≦500 nm, the thickness of said base film is in a range of 0<t≦20 nm, and the thickness ratio of said main magnetic film to said base film is at least 15, and said soft magnetic film further comprising a first insulating film on the top surface thereof and a second insulating film between said substrate and said cyclic structure.

14. A multilayered soft magnetic film comprising:

at least one compound layer alternately comprising a base film composed of either Ni-Fe alloy or an alloy containing Ni and Fe as main components;

a main magnetic film composed of either Fe or an Alloy containing Fe as a main component;

said base film and said main magnetic film being stacked alternately and repeatedly on a substrate so as to form a cyclic structure;

wherein the thickness of said main magnetic film is in a range of 0<t≦500 nm, the thickness of said base film is in a range of 0<t≦20 nm, and the thickness ratio of said main magnetic film to said base film is at least 5; and said multilayered soft magnetic film further comprising an insulating film on the top surface thereof.

15. A multilayered soft magnetic film comprising:

a substrate; and at least one compound layer arranged on said substrate, said compound layer including at least two film pairs each including a base film composed of either Ni-Fe alloy or an alloy containing Ni and Fe as main components and a main magnetic film composed of either Fe or an alloy containing Fe as a main component, said film pairs being arranged on said a substrate in like order to form a regularly repeating structure, wherein the thickness of said main magnetic film is in a range of 0<t≦500 nm, the thickness of said base film is in a range of 0<t≦20 nm, and the thickness ratio of said main magnetic film to said base film i s at least 30.

16. A multilayered soft magnetic film as claimed in claim 2 wherein said insulating film is an $SiO_2$ film.

17. A multilayered soft magnetic film as claimed in claim 9 wherein said insulating film is an $SiO_2$ film.

18. A multilayered soft magnetic film as claimed in claim 10 wherein said insulating film is an $SiO_2$ film.

19. A multilayered soft magnetic film as claimed in claim 12 wherein said first insulating film is an $SiO_2$ film.

20. A multilayered soft magnetic film as claimed in claim 19 wherein said second insulating film is an $SiO_2$ film.

21. A multilayered soft magnetic film as claimed in claim 13 wherein said first insulating film is an $SiO_2$ film.

22. A multilayered soft magnetic film as claimed in claim 21 wherein said second insulating film is an $SiO_2$ film.

23. A multilayered soft magnetic film as claimed in claim 14 wherein said insulating film is an $SiO_2$ film.

* * * * *